(12) United States Patent
Kwon et al.

(10) Patent No.: US 8,283,962 B2
(45) Date of Patent: Oct. 9, 2012

(54) SEMICONDUCTOR DEVICE AND OPERATION METHOD THEREOF FOR GENERATING PHASE CLOCK SIGNALS

(75) Inventors: Dae-Han Kwon, Kyoungki-do (KR); Kyung-Hoon Kim, Kyoungki-do (KR); Dae-Kun Yoon, Kyoungki-do (KR); Taek-Sang Song, Kyoungki-do (KR)

(73) Assignee: Hynix Semiconductor Inc. (KR)

( * ) Notice: Subject to any disclaimer, the term of this patent is extended or adjusted under 35 U.S.C. 154(b) by 372 days.

(21) Appl. No.: 12/005,515

(22) Filed: Dec. 27, 2007

(65) Prior Publication Data

US 2009/0115467 A1 May 7, 2009

(30) Foreign Application Priority Data

Nov. 5, 2007 (KR) .................. 10-2007-0112034

(51) Int. Cl.
*H03K 3/00* (2006.01)
(52) U.S. Cl. ...................................... 327/295; 327/291
(58) Field of Classification Search .................. 327/291, 327/293, 295, 296, 165, 166
See application file for complete search history.

(56) References Cited

U.S. PATENT DOCUMENTS

| | | | | |
|---|---|---|---|---|
| 4,394,769 A | * | 7/1983 | Lull | 377/116 |
| 5,867,046 A | * | 2/1999 | Sugasawa | 327/258 |
| 6,426,662 B1 | * | 7/2002 | Arcus | 327/295 |
| 6,700,425 B1 | * | 3/2004 | Pilling | 327/291 |
| 6,894,551 B2 | * | 5/2005 | Johnson | 327/258 |
| 7,030,674 B2 | * | 4/2006 | Johnson | 327/258 |
| 7,583,247 B2 | * | 9/2009 | Park et al. | 345/100 |

FOREIGN PATENT DOCUMENTS

KR 10-2007-0036549 A 4/2007

\* cited by examiner

*Primary Examiner* — Hai L Nguyen
(74) *Attorney, Agent, or Firm* — Blakely, Sokoloff, Taylor & Zafman

(57) ABSTRACT

A semiconductor memory device can optimize the layout area and current consumption based on multi-phase clock signals which are generated by dividing a source clock signal using a reset signal without a delay locked loop and a phase locked loop in order to have various phase information of low frequencies and different activation timings with a constant phase difference.

21 Claims, 4 Drawing Sheets

SEMICONDUCTOR DEVICE AND OPERATION METHOD THEREOF FOR GENERATING PHASE CLOCK SIGNALS

CROSS-REFERENCES TO RELATED APPLICATION

The present application claims priority to Korean application number 10-2007-0112034, filed on Nov. 5, 2007, which is incorporated by reference in its entirety.

BACKGROUND OF THE INVENTION

The present invention relates to a semiconductor design technology and, more particularly, to a semiconductor device for generating a multi-phase clock signal, which has a plurality of phase information, with a minimum layout area and optimal current consumption.

Generally, a semiconductor device, such as a DDR SDRAM (Double Data Rate Synchronous DRAM), receives an external clock signal to generate an internal clock signal, and the internal clock signal is inputted to several circuits within the semiconductor device to operate each circuit.

Meanwhile, the current semiconductor device has been developed with the features of large capacity, high speed and low current consumption. Particularly, in order to achieve high speed operation, the semiconductor device is designed to operate in response to the external clock signal having a higher frequency.

Recently, since the frequency of the external clock signal has been raised to a few GHz, the frequency of the internal clock signal is also raised within the semiconductor device, thereby causing many problems in the operation timing margin of a circuit and current consumption.

In order to solve the problems, the semiconductor device employs a method of transferring a multi-phase clock signal. This method is not to transfer a clock signal which has the same high frequency as the external clock signal, but to transfer a plurality of phase clock signals which have a low frequency which corresponds to a half of the high frequency of the external clock signal and have a plurality of phase information, when the internal clock signal is transferred within the semiconductor device. The semiconductor device transfers the internal clock signal by such a method, thereby reducing current consumption caused by internal clock signal transmission and securing a stable timing margin.

Generally, in order to generate the plurality of the phase clock signals, the semiconductor device can include a phase locked loop (PLL) or a delay locked loop (DLL).

FIG. 1 is a block diagram illustrating a conventional phase locked loop for generating a plurality of phase clock signals.

Referring to FIG. 1, the phase locked loop includes a clock frequency divider 110, a control voltage signal generating unit 130 and a voltage control oscillating unit 150.

The clock frequency divider 110 divides a frequency of a reference clock signal CLK_REF which corresponds to an external clock signal. The high frequency of the external clock signal is thus reduced by the clock frequency divider 110.

The control voltage signal generating unit 130 detects a phase of a clock signal generated from the division of the frequency of the reference clock signal CLK_REF by the clock frequency divider 110 and from a phase of a feedback clock signal CLK_FED, thereby generating a control voltage signal V_CTR which has a voltage level corresponding to that of the feedback clock signal CLK_FED.

The voltage control oscillating unit 150 generates a plurality of phase clock signals each having a frequency corresponding to the control voltage signal V_CTR, namely, first to fourth phase clock signals MCLK0, MCLK90, MCLK180 and MCLK270. Among the first to fourth phase clock signals MCLK0, MCLK90, MCLK180 and MCLK270, the third phase clock signal MCLK180 becomes the feedback clock signal CLK_FED which is fed back to the control voltage signal generating unit 130.

The phase locked loop repetitively compares the phase of the clock signal generated from the division of the frequency of the reference clock signal CLK_REF with that of the feedback clock signal CLK_FED in order to generate the first to fourth phase clock signals MCLK0, MCLK90, MCLK180 and MCLK270 each of which has a desired frequency. The finally generated first to fourth phase clock signals MCLK0, MCLK90, MCLK180 and MCLK270 have a constant phase difference and a frequency lower than that of the external clock signal. That is, the second phase clock signal MCLK90 is 90° out of phase with the first phase clock signal MCLK0, the third phase clock signal MCLK180 is 180° out of phase with the first phase clock signal MCLK0, and the fourth phase clock signal MCLK270 is 270° out of phase with the first phase clock signal MCLK0.

Here, since the technical implementation and the operation of the clock frequency divider 110, the control voltage signal generating unit 130 and the voltage control oscillating unit 150 are obvious to those skilled in the art, a detailed explanation for them will not be described.

Meanwhile, generally, the voltage control oscillating unit 150 includes a plurality of delay cells (not illustrated), and the first to fourth phase clock signals MCLK0, MCLK90, MCLK180 and MCLK270 correspond to clock signals outputted from the delay cells. Therefore, in order for the first to fourth phase clock signals MCLK0, MCLK90, MCLK180 and MCLK270 to have an accurate phase difference, the plurality of the delay cells should be identically included and the loadings between the delay cells should be accurately consistent. Also, in order to reduce external noise, a signal or power line should not pass around the voltage control oscillating unit 150. However, such a design has a demerit of occupying too much layout area.

Similar to the phase locked loop, the delay locked loop can also generate the plurality of the phase clock signals. However, there is also a demerit in that the delay locked loop is difficult to design and occupies too much layout area. Also, the phase locked loop and the delay locked loop cause much current consumption during circuit operation.

As described above, the phase locked loop and the delay locked loop, which can generate the plurality of the phase clock signals, have demerits in that there are lots of things to be considered when designing them, they occupy too much layout area, and they consume too much current during circuit operation. Thus, they are an obstacle to low current consumption and high integration in the semiconductor device. The present invention will suggest a solution for such problems.

SUMMARY OF THE INVENTION

An embodiment of the present invention is directed to providing a semiconductor device for generating a plurality of phase clock signals in response to a plurality of reset signals having different activation timings according to a constant phase difference and an operation method of the semiconductor device.

Another embodiment of the present invention is directed to providing a semiconductor device for generating a plurality of phase clock signals without a delay locked loop and a phase locked loop and an operation method of the semiconductor device.

According to the present invention, a semiconductor memory device can optimize the layout area and current consumption based on multi-phase clock signals which are generated by dividing a source clock signal using a reset signal without a delay locked loop and a phase locked loop in order to have various phase information of low frequencies and different activation timings with a constant phase difference.

BRIEF DESCRIPTION OF THE DRAWINGS

The above and other aspects, features and other advantages of the subject matter of the present disclosure will be more clearly understood from the following detailed description taken in conjunction with the accompanying drawings, in which.

DETAILED DESCRIPTION OF THE PREFERRED EMBODIMENTS

Hereinafter, the present invention will be described in detail through embodiments. The embodiments are just for exemplifying the present invention, and the scope of right to be protected of the present invention is not limited by them.

Figure 1:
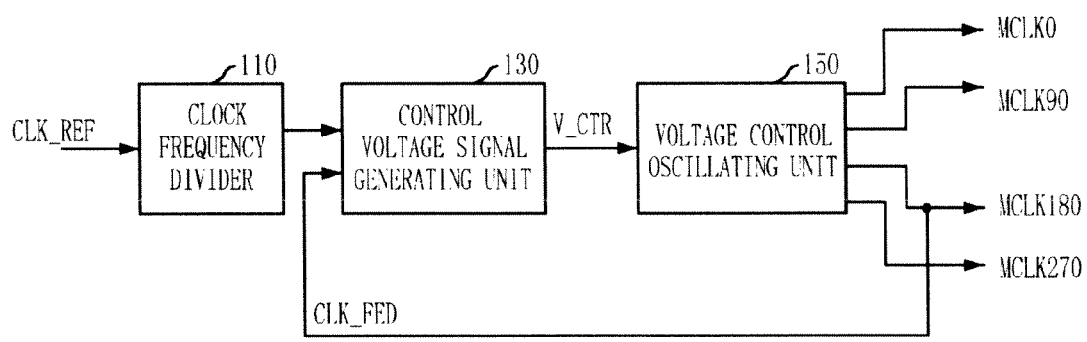
FIG. 1 is a block diagram illustrating a conventional phase locked loop for generating a plurality of phase clock signals.
Figure 2:
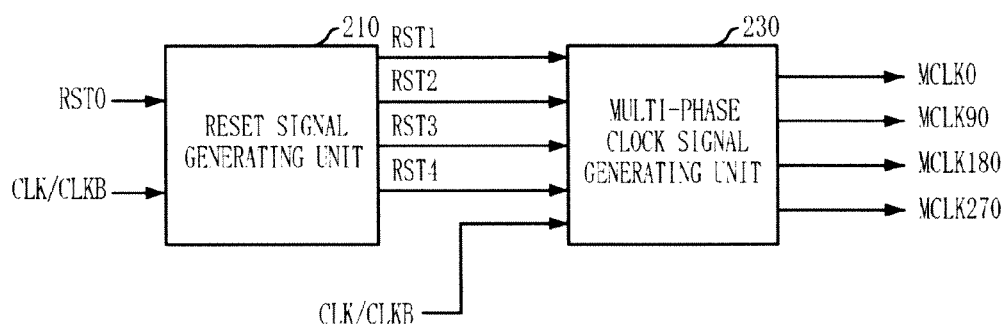
FIG. 2 is a block diagram illustrating a multi-phase clock signal generating circuit according to the present invention.

FIG. 2 is a block diagram illustrating a multi-phase clock signal generating circuit according to the present invention.

Referring to FIG. 2, the multi-phase clock signal generating circuit includes a reset signal generating unit 210 and a multi-phase clock signal generating unit 230.

The reset signal generating unit 210 receives a source reset signal RST0 to generate first to fourth reset signals RST1, RST2, RST3 and RST4, having different activation timings with a constant phase difference, in response to clock signals CLK and CLKB.

Here, the source reset signal RST0 is activated first in order to operate the multi-phase clock signal generating circuit. The clock signals CLK and CLKB, which respond to an external clock signal, include a positive clock signal CLK responding to a rising edge of the external clock signal and a negative clock signal CLKB responding to a falling edge of the external clock signal. Particularly, the activation timings of the first to fourth reset signals RST1, RST2, RST3 and RST4 are sequentially decided in response to the positive and negative clock signals CLK and CLKB.

Meanwhile, the multi-phase clock signal generating unit 230 operates in response to the first to fourth reset signals RST1, RST2, RST3 and RST4 and divides the frequencies of the positive and negative clock signals CLK and CLKB to generate first to fourth phase clock signals MCLK0, MCLK90, MCLK180 and MCLK270 which have a constant phase difference.

Here, the first phase signal MCLK0 corresponds to the rising edge of the positive clock signal CLK, the second phase signal MCLK90 is 90° out of phase with the first phase clock signal MCLK0, the third phase clock signal MCLK180 is 180° out of phase with the first phase clock signal MCLK0, and the fourth phase clock signal MCLK270 is 270° out of phase with the first phase clock signal MCLK0.

According to the present invention, it is possible to generate a plurality of phase clock signals having a constant phase difference without using a delay locked loop and a phase locked loop.

Figure 3:
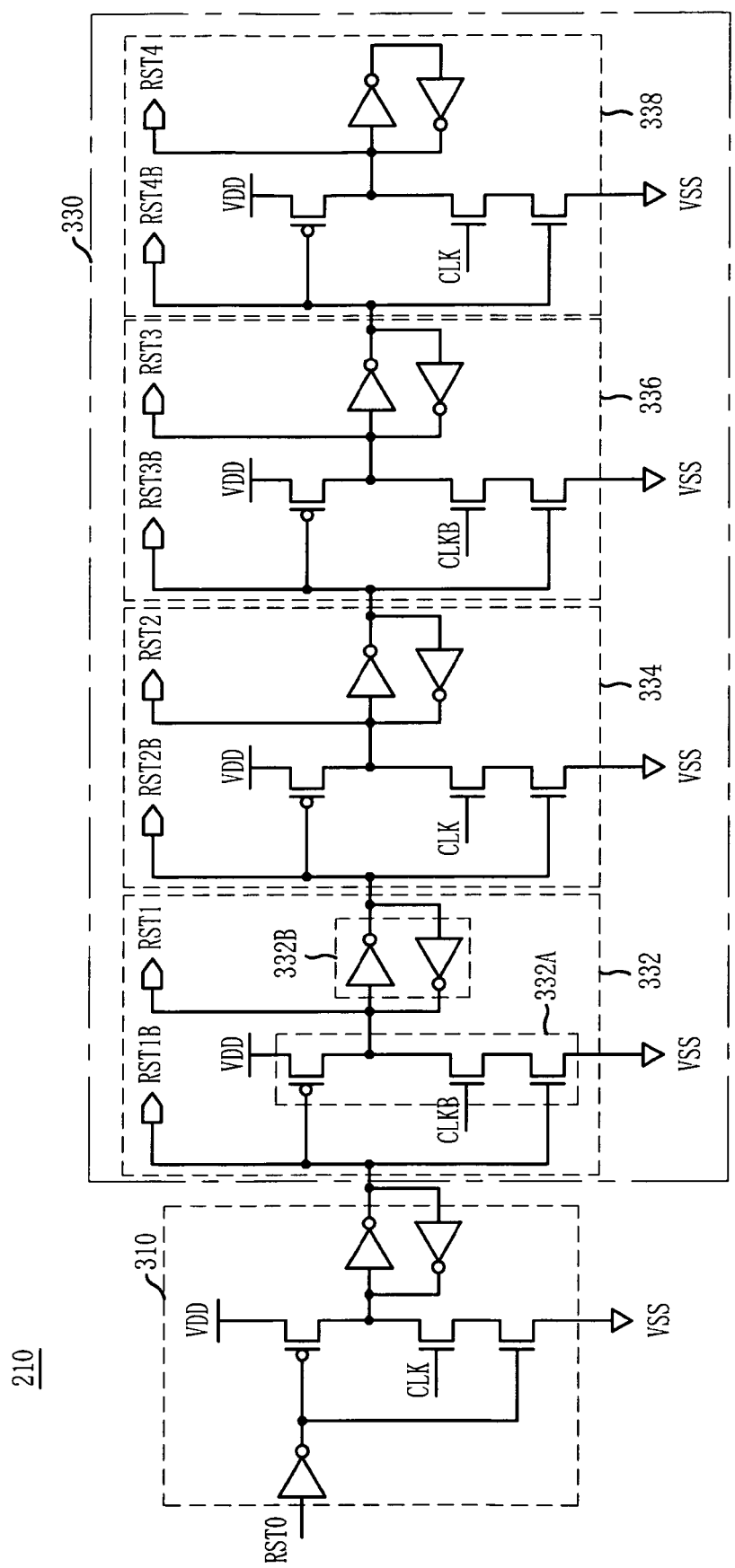
FIG. 3 is a circuit diagram illustrating a reset signal generating unit of FIG. 2.

FIG. 3 is a circuit diagram illustrating a reset signal generating unit 210 of FIG. 2.

Referring to FIG. 3, the reset signal generating unit 210 includes a source reset signal input unit 310 and a shifting unit 330.

The source reset signal input unit 310 receives the source reset signal RST0 to generate a first negative reset signal RST1B in response to the positive clock signal CLK. For example, when the source reset signal RST0 is in a high level, the first negative reset signal RST1B is in a low level, and when the source reset signal RST0 is in a low level, the first negative reset signal RST1B is in a high level in response to the positive clock signal CLK. Here, an output signal of the source reset signal input unit 310 can be used as a reference signal of the first to fourth reset signals RST1, RST2, RST3 and RST4.

The shifting unit 330 shifts the output signal of the source reset signal input unit 310 in response to the positive and negative clock signals CLK and CLKB to generate the first to fourth reset signals RST1, RST2, RST3 and RST4. A plurality of first to fourth shifters 332, 334, 336 and 338 are included in the shifting unit 330.

Here, the first reset signal includes a first positive reset signal RST1, which corresponds to the first phase clock signal MCLK0, and the first negative reset signal RST1B, the second reset signal includes a second positive reset signal RST2, which corresponds to the second phase clock signal MCLK90, and a second negative reset signal RST2B, the third reset signal includes a third positive reset signal RST3, which corresponds to the third phase clock signal MCLK180, and a third negative reset signal RST3B, and the fourth reset signal includes a fourth positive reset signal RST4, which corresponds to the fourth phase clock signal MCLK270, and a fourth negative reset signal RST4B. A detailed waveform diagram of such signals will be explained later through FIG. 4.

Meanwhile, since the first to fourth shifters 332, 334, 336 and 338 have the same configuration, only the first shifter 332 will be described here for convenience in illustration.

The first shifter 332 includes a reset signal output unit 332A which receives the first negative reset signal RST1B to output the first positive reset signal RST1 in response to the negative clock signal CLKB and a reset signal latch unit 332B which latches the first positive reset signal RST1 to output the second negative reset signal RST2B.

Therefore, in case that the first negative reset signal RST1B is in a low level, the first positive reset signal RST1 is in a high level, and in case that the first-negative reset signal RST1B is in a high level, the first positive reset signal RST1 is in a low level in response to the negative clock signal CLKB.

The second to fourth shifters 334, 336 and 338 operate the same as the first shifter 332. Thus, each of the first to fourth shifters 332, 334, 336 and 338 receives an output signal of its previous shifter and outputs a reset signal in response to the positive clock signal CLK or the negative clock signal CLKB.

In detail, the first shifter 332 receives an output signal of the source reset signal input unit 310 to output the first positive reset signal RST1 in response to the negative clock signal CLKB and latches the first positive reset signal RST1 to output the second negative reset signal RST2B. The second shifter 334 receives the second negative reset signal RST2B to output the second positive reset signal RST2 in response to the positive clock signal CLK and latches the second positive reset signal RST2 to output the third negative reset signal RST3B. The third shifter 336 receives the third negative reset signal RST3B to output the third positive reset signal RST3 in response to the negative clock signal CLKB and latches the third positive reset signal RST3 to output the fourth negative reset signal RST4B. The fourth shifter 338 receives the fourth negative reset signal RST4B to output the fourth positive reset signal RST4 in response to the positive clock signal CLK and latches the fourth positive reset signal RST4.

That is, the first shifter 332 shifts the output signal of the source reset signal input unit 310 to output the first positive reset signal RST1 in response to the negative clock signal CLKB, the second shifter 334 shifts the output signal of the first shifter 332 to output the second positive reset signal RST2 in response to the positive clock signal CLK, the third shifter 336 shifts the output signal of the second shifter 334 to output the third positive reset signal RST3 in response to the negative clock signal CLKB, and the fourth shifter 338 shifts the output signal of the third shifter 336 to output the fourth positive reset signal RST4 in response to the positive clock signal CLK.

Figure 4:
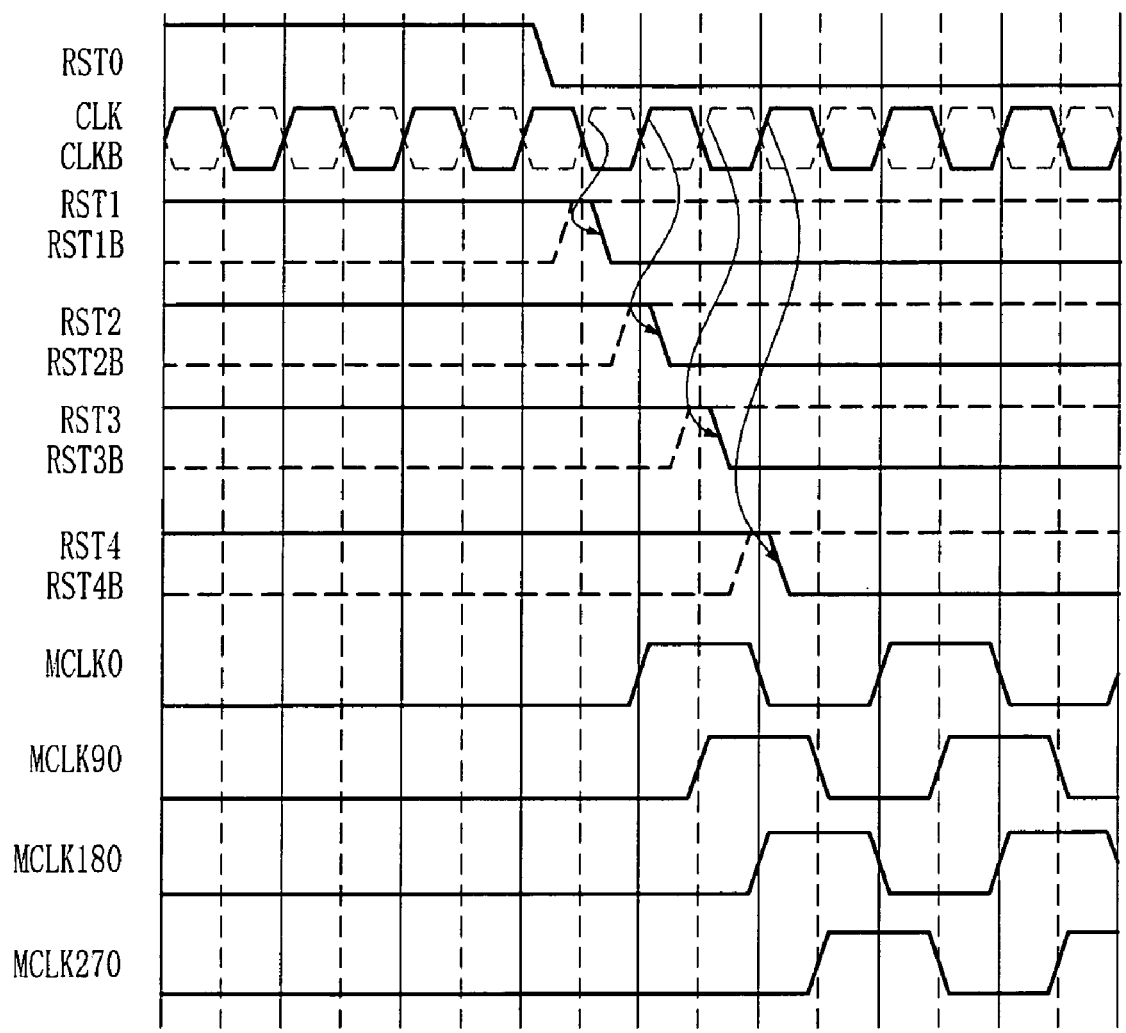
FIG. 4 is a waveform diagram illustrating an operation of I/O signals according to the present invention.

FIG. 4 is a waveform diagram illustrating waveforms of I/O signals according to the present invention. It can be seen that the phase difference between adjacent ones of the reset signals is the same, i.e. RST1 and RST2 have the same phase difference as RST2 and RST3, which has the same phase difference as between RST3 and RST4.

Referring to FIGS. 3 and 4, when the source reset signal RST0 is in a high level, the first to fourth positive reset signals RST1, RST2, RST3 and RST4 are in a high level and the first to fourth negative reset signals RST1B, RST2B, RST3B and RST4B are in a low level regardless of the positive and negative clock signals CLK and CLKB.

Then, when the source reset signal RST0 is in a low level and the positive clock signal CLK is in a high level, the first negative reset signal RST1B is in a high level. The reset signal output unit 332A of the first shifter 332 outputs the first positive reset signal RST1, which is in a low level, in response to the negative clock signal CLKB. The reset signal latch unit 332B of the first shifter 332 latches the first positive reset signal RST1 and outputs the second negative reset signal RST2B which is in a high level.

Similarly, the second shifter 334 receives second negative reset signal RST2B to output the second positive reset signal RST2, which is in a low level, in response to the positive clock signal CLK and outputs the third negative reset signal RST3B which is in a high level. The third shifter 336 receives the third negative reset signal RST3B to output the third positive reset signal RST3, which is in a low level, in response to the negative clock signal CLKB and outputs the fourth negative reset signal RST4B which is in a high level. The fourth shifter 338 receives the fourth negative reset signal RST4B to output the fourth positive reset signal RST4, which is in a low level, in response to the positive clock signal CLK.

Figure 5:
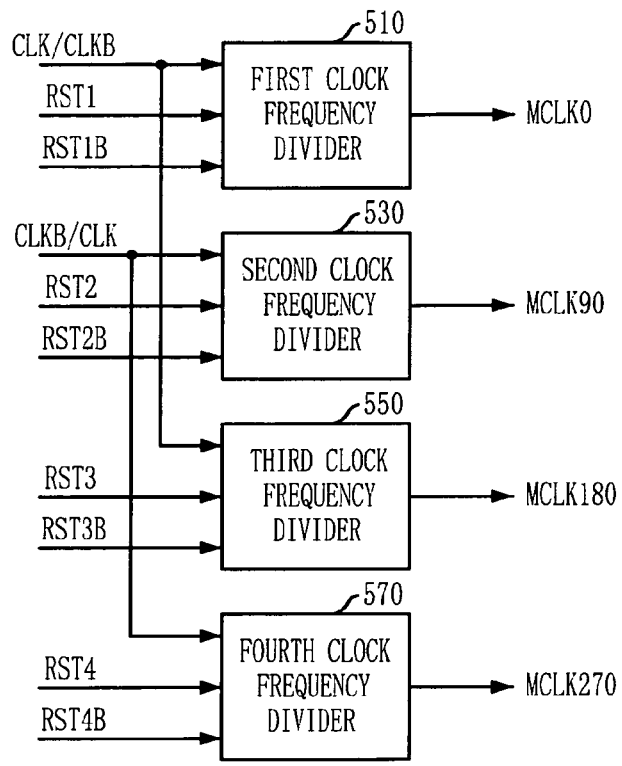
FIG. 5 is a block diagram illustrating a multi-phase clock signal generating unit of FIG. 2.
Figure 6:
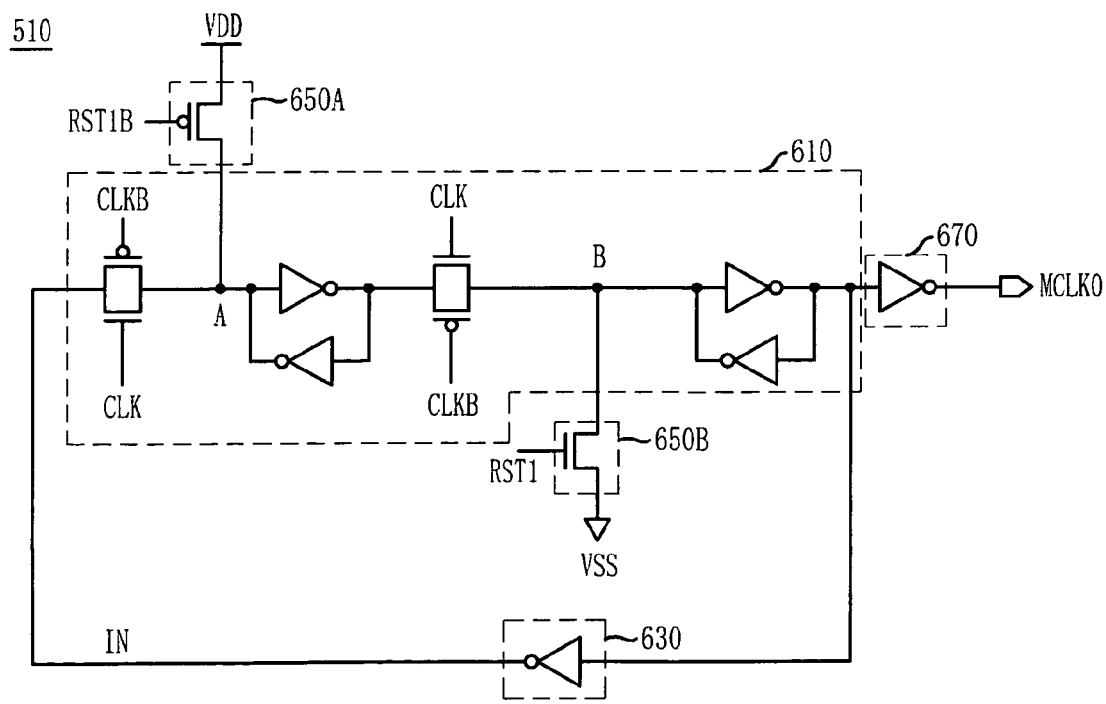
FIG. 6 is a circuit diagram illustrating a first clock frequency divider of FIG. 5.

For convenience in illustration, the first to fourth phase clock signals MCLK0, MCLK90, MCLK180 and MCLK270 will be described after FIGS. 5 and 6 are illustrated.

FIG. 5 is a block diagram illustrating a multi-phase clock signal generating unit of FIG. 2.

Referring to FIG. 5, the multi-phase clock signal generating unit 230 includes first to fourth clock frequency dividers 510, 530, 550 and 570.

The first clock frequency divider 510 operates in response to the first positive and negative reset signals RST1 and RSTB and divides the frequencies of the positive and negative clock signals CLK and CLKB to generate the first phase clock signal MCLK0. The second clock frequency divider 530 operates in response to the first positive and negative reset signals RST1 and RSTB and divides the frequencies of the positive and negative clock signals CLK and CLKB to generate the second phase clock signal MCLK90. The third clock frequency divider 550 operates in response to the first positive and negative reset signals RST1 and RSTB and divides the frequencies of the positive and negative clock signals CLK and CLKB to generate the third phase clock signal MCLK180. The fourth clock frequency divider 570 operates in response to the first positive and negative reset signals RST1 and RSTB and divides the frequencies of the positive and negative clock signals CLK and CLKB to generate the fourth phase clock signal MCLK270.

FIG. 6 is a circuit diagram illustrating the first clock frequency divider 510 of FIG. 5.

Referring to FIG. 6, the first clock frequency divider 510 includes a phase clock signal latch unit 610, a feedback unit 630, reset units 650A and 650B and a phase clock signal output unit 670.

The phase clock signal latch unit 610 latches an input signal IN, which is fed back from the feedback unit 630, in response to the positive and negative clock signals CLK and CLKB. The feedback unit 630 receives an output signal of the phase clock signal latch unit 610 to output a feedback signal as the input signal IN. The first reset unit 650A sets or resets node A of the phase clock signal latch unit 610 in response to the first negative reset signal RST1B. The second reset unit 650B sets or resets node B in response to the first positive reset signal RST1. The phase clock signal output unit 670 outputs an output signal of the phase clock signal latch unit 610 as the first phase clock signal MCLK0.

Here, the phase clock signal latch unit 610 can include flip-flop circuits. Also, it is possible to use a circuit which is set or reset by the first positive and negative reset signals RST1 and RST1B and divides the frequencies of the positive and negative clock signals CLK and CLKB.

Meanwhile, the first to fourth clock frequency dividers 510, 530, 550 and 570 can have the same circuit configurations. Referring to FIG. 6, the positive and negative reset signals corresponding to the second to fourth clock frequency dividers 530, 550 and 570 can be inputted to the second to fourth clock frequency dividers 530, 550 and 570 instead of the first positive and negative reset signals RST1 and RST1B inputted to the first clock frequency divider 510, and the positive and negative clock signals CLK and CLKB can be inversely inputted to the second clock frequency divider 530 and the fourth clock frequency divider 570.

Therefore, the first clock frequency divider 510 outputs the first phase clock signal MCLK0 of which the frequency is divided in response to the positive clock signal CLK, the second clock frequency divider 530 outputs the second phase clock signal MCLK90 in response to the negative clock signal CLKB, the third clock frequency divider 550 outputs the third phase clock signal MCLK180 in response to the positive clock signal CLK, and the fourth clock frequency divider 570 outputs the fourth phase clock signal MCLK270 in response to the negative clock signal CLKB.

Referring again to FIG. 4, as described above, when the source reset signal RST0 is in a low level, the activation timings of the first to fourth reset signals RST1, RST2, RST3 and RST4 are sequentially decided in response to the positive and negative clock signals CLK and CLKB. Also, the first to fourth clock frequency dividers 510, 530, 550 and 570 sequentially prepare to output the first to fourth phase clock signals MCLK0, MCLK90, MCLK280 and MCLK270 in response to the first to fourth reset signals RST1, RST2, RST3 and RST4 and outputs them in response to the positive and negative clock signals CLK and CLKB.

The first to fourth phase clock signals MCLK0, MCLK90, MCLK280 and MCLK270 become low frequency multi-phase clock signals having a phase difference of 90° from each other.

Since the present invention generates the first to fourth phase clock signals MCLK0, MCLK90, MCLK280 and MCLK270 having a constant phase difference without the phase locked loop and the delay locked loop, a layout area and current consumption can be minimized and its design can be simplified.

While the present invention has been described with respect to the particular embodiments, it will be apparent to those skilled in the art that various changes and modifications may be made without departing from the spirit and scope of the invention.

For example, the position and kind of the logic gate and transistor shown in one embodiment of the present invention should be changed according to the polarity of inputted signals.

Further, in one embodiment of the present invention, the case where the same positive and negative reset signals CLK and CLKB are inputted to the reset signal generating unit 210 and the multi-phase clock signal generating unit 230 is described. However, the present invention can also be applied to the case where other control signals are inputted to the reset signal generating unit 210. That is, the control signal inputted to the reset signal generating unit 210 only has to make the plurality of the reset signals have sequential activation timings with a constant phase difference.

What is claimed is:

1. A semiconductor device comprising:
a reset signal generating unit configured to generate a plurality of reset signals in response to a control signal, wherein the plurality of the reset signals have different activation timings according to a constant phase difference; and
a multi-phase clock signal generating unit configured to divide a frequency of a source clock signal in response to the plurality of the reset signals in order to generate a plurality of phase clock signals having the constant phase difference,
wherein each reset signal of the plurality of reset signals is generated by shifting a previous reset signal,
wherein the source clock signal has twice the frequency of the phase clock signals,
wherein the plurality of the phase clock signals include first to fourth phase clock signals having the constant phase difference,
wherein the plurality of the reset signals include first positive and negative reset signals corresponding to the first phase clock signal, second positive and negative reset signals corresponding to the second phase clock signal, third positive and negative reset signals corresponding to the third phase clock signal and fourth positive and negative reset signals corresponding to the fourth phase clock signal.

2. The semiconductor device of claim 1, wherein the control signal includes the source clock signal and wherein the activation timings of the plurality of the reset signals are sequentially decided in response to the source clock signal.

3. The semiconductor device of claim 1, wherein the reset signal generating unit includes:
a source reset signal input unit for receiving the source reset signal to output a signal in response to the control signal; and
a plurality of shifters for shifting an output signal of the source reset signal input unit in response to the control signal to output the plurality of the reset signals.

4. The semiconductor device of claim 3, wherein each of the shifters receives an output signal of a previous shifter to output the reset signal in response to the control signal.

5. The semiconductor device of claim 1, wherein the control signal includes a positive control signal corresponding to a rising edge of an external clock signal and a negative control signal corresponding to a falling edge of the external clock signal.

6. The semiconductor device of claim 5, wherein the source reset signal input unit operates in response to the positive control signal.

7. The semiconductor device of claim 5, wherein the reset signal generating unit includes:
a first shifter for shifting the output signal of the source reset signal input unit in response to the negative control signal to output the first positive reset signal;
a second shifter for shifting an output signal of the first shifter in response to the positive control signal to output the second positive reset signal;
a third shifter for shifting an output signal of the second shifter in response to the negative control signal to output the third positive reset signal; and
a fourth shifter for shifting an output signal of the third shifter in response to the positive control signal to output the fourth positive reset signal.

8. The semiconductor device of claim 7, wherein each of the first to fourth shifters includes:
a reset signal output unit for receiving the negative reset signal to output the positive reset signal in response to the control signal; and
a reset signal latch unit for latching the positive reset signal to output the negative reset signal.

9. The semiconductor device of claim 1, wherein the multi-phase clock signal generating unit includes:
a first clock frequency divider for operating in response to the first positive and negative reset signals and dividing the source clock signal to generate the first phase clock signal;
a second clock frequency divider for operating in response to the second positive and negative reset signals and dividing the source clock signal to generate the first phase clock signal;
a third clock frequency divider for operating in response to the third positive and negative reset signals and dividing the source clock signal to generate the third phase clock signal; and
a fourth clock frequency divider for operating in response to the fourth positive and negative reset signals and dividing the source clock signal to generate the fourth phase clock signal.

10. The semiconductor device of claim 9, wherein each of the first to fourth clock frequency dividers includes:
a phase clock signal latch unit for latching an input signal in response to the source clock signal;
a reset unit for operating the phase clock signal latch unit in response to the reset signal; and a feedback unit for receiving an output signal of the phase clock signal latch unit to output a feedback signal as the input signal.

11. The semiconductor device of claim 10, further comprising a phase clock signal output unit for receiving the output signal of the phase clock signal latch unit to output the phase clock signal.

12. A method for operating a semiconductor device, comprising the steps of:
generating a plurality of reset signals in response to a control signal by shifting a previous reset signal of the plurality of reset signals, wherein the plurality of the reset signals have different activation timings with adjacent ones having the same phase difference; and
operating in response to the plurality of the reset signals and dividing a frequency of a source clock signal to generate a plurality of phase clock signals with adjacent ones having the same phase difference,
wherein the source clock signal has twice the frequency of the phase clock signals,
wherein the plurality of the phase clock signals include first and second phase clock signals having the constant phase difference,
wherein the plurality of the reset signals include first positive and negative reset signals corresponding to the first phase clock signal and second positive and negative reset signals corresponding to the second phase clock signal.

13. The operation method of claim 12, wherein the control signal includes the source clock signal and wherein the activation timings of the plurality of the reset signals are sequentially decided in response to the source clock signal.

14. The operation method of claim 12, wherein the step of the generating a plurality of reset signals includes the steps of:
receiving a source reset signal to output a reference signal in response to the control signal; and
shifting the reference signal in response to the control signal to output the plurality of the reset signals.

15. The operation method of claim 12, wherein the control signal includes a positive control signal corresponding to a rising edge of an external clock signal and a negative control signal corresponding to a falling edge of the external clock signal.

16. The operation method of claim 15, wherein the step of the generating the plurality of reset signals includes the steps of:
shifting the reference signal in response to the negative control signal to output the first positive reset signal; and
shifting a signal corresponding to the first positive reset signal in response to the positive control signal to output the second positive reset signal.

17. The operation method of claim 16, wherein each of the steps the shifting the signal corresponding to the first positive reset signal includes the steps of:
receiving the reference signal to output the first positive reset signal in response to the control signal; and
latching the first positive reset signal to output the first negative reset signal.

18. The operation method of claim 17, wherein the shifting the signal corresponding to the second positive reset signal includes the steps of:
receiving the first negative reset signal to output the second positive reset signal in response to the control signal; and
latching the second positive reset signal to output the second negative reset signal.

19. The operation method of claim 12, wherein the step of the operating includes the steps of:
dividing the source clock signal to generate the first phase clock signal in response to the first positive and negative reset signals; and
dividing the source clock signal to generate the second phase clock signal in response to the second positive and negative reset signals.

20. The operation method of claim 19, wherein each of the steps of the dividing the source clock signal and the dividing the source clock signal includes the steps of:
latching an input signal in response to the source clock signal;
receiving the latched output signal to perform a feedback on the output signal as the input signal.

21. A semiconductor device having a multi-phase clock signal generating means, the multi-phase clock signal generating means comprising:
a plurality of shifters for shifting an input signal in response to first and second clock signals and subsequently producing a plurality shifting signals through latch units, wherein the first clock signal is out of phase with the second clock signal and the subsequently produced shifting signals are out of phase with adjacent ones having a constant phase difference; and
a plurality of clock signal generating units for generating clock signals using the first and second clock signals and the plurality shifting signals, wherein each of the clock signal generating units has a signal path having a latch unit, wherein the signal path is controlled by the first or second clock signal and wherein an input signal of the clock signal generating unit is provided by a feedback loop.

* * * * *